UNITED STATES PATENT OFFICE.

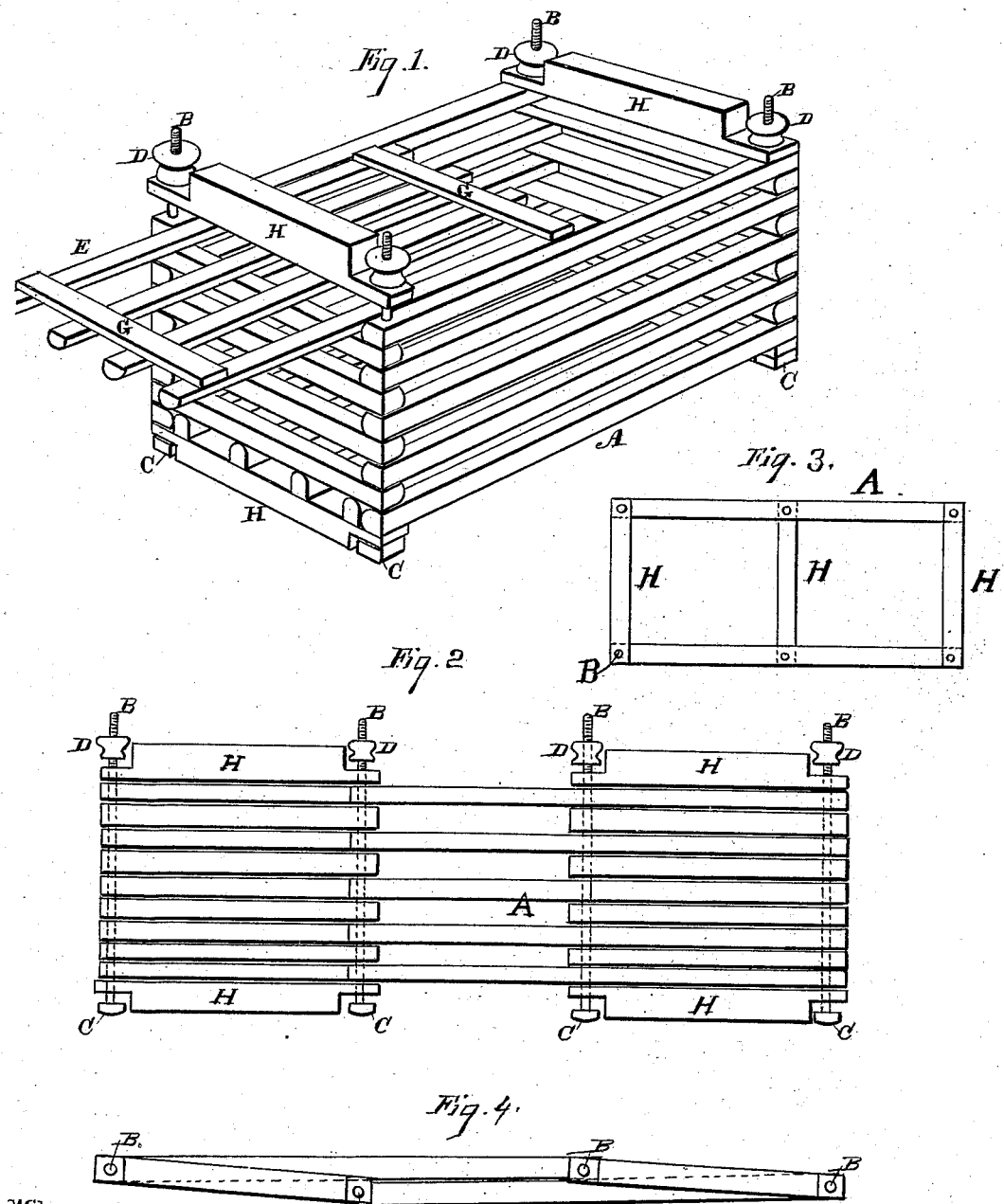

ROSWELL E. MOREY, OF SAN FRANCISCO, ASSIGNOR TO J. HENLEY SMITH, OF SAME PLACE, AND J. DE BARTH SHORB, OF SAN GABRIEL, CALIFORNIA, ONE-THIRD TO EACH.

RETURN-CRATE.

SPECIFICATION forming part of Letters Patent No. 224,939, dated February 24, 1880.

Application filed December 8, 1879.

*To all whom it may concern:*

Be it known that I, ROSWELL E. MOREY, of the city and county of San Francisco, and State of California, have invented an Improved Return-Crate; and I hereby declare the following to be a full, clear, and exact description thereof.

My invention relates to certain improvements in crates or boxes which are employed for the purpose of shipping fruit and other articles to market; and it consists in the combination of devices hereinafter described and claimed.

Referring to the accompanying drawings for a more complete explanation of my invention, Figure 1 is a view of my crate or box in position with the top partly withdrawn. Figs. 2 and 4 are views of the crate reduced for transportation. Fig. 3 is a crate having a partition.

In sending fruit, vegetables, poultry, game, and other articles to market, boxes, crates, or coops must be employed, and these, when empty, are either broken up or lost to the shipper, or else they must be returned by the transportation companies at their own expense, which is the usual custom.

In order to reduce these empty packages to smaller dimensions, so that the expense of transportation will be lessened, various methods for folding them have been tried, in many of which hinges have been employed. These hinges become broken or torn off, and the expense of manufacturing is also considerable.

In my invention I form my crate or box with the sides and ends of bars A, which are preferably rounded on the inside by suitable means, so as not to bruise the contents. The ends of these bars, forming the sides and ends, meet at the four angles, and a long bolt, B, passes through the overlapping ends at each of the four corners, extending from top to bottom.

A head, C, is formed at one end of each bolt, and a screw-thread is cut upon the other end, upon which a nut, D, turns to secure the parts together.

The top and bottom E F may be made of slats, as shown, or of boards, to form a tight top and bottom, as may be desired, and a strip, G, is secured across, near each end, this strip being of considerable thickness.

A stout bar, H, is fitted across each end of the box, and the ends are perforated, so that the bolts will pass through their ends, as shown.

In order to protect the heads of the bolts at one end and the nuts at the opposite end, the bars H may have their ends notched or cut down, so that the central portion will be higher than the heads and nuts. The boxes or crates will then lie upon these raised portions, and the nuts and bolt-heads will not rest upon the floor.

When the cover is to be removed the nuts D are unscrewed, so that the bars H will not bind or press upon the cover, and the bar, at the end from which the cover is to be withdrawn, must be raised sufficiently to allow the strips or cleats G to pass beneath it. The cover will then slide out and expose the contents of the crate.

When the crate is empty, and it is desired to fold it and reduce its size, the bottom must be removed in the same manner as has been described for the top, when the sides and ends will turn easily about the bolts and fold together, the bars, forming the sides and ends, folding into the alternate spaces so as to lie flat together, as shown in Fig. 2. The top and bottom being thus packed upon them, the whole will occupy but little more space than the thickness of the material.

When the box is set up and the bottom and top are in place the cleats G lie just inside the bars H, and closely against them, and when the nuts are screwed down firmly it will be seen that the bars form a strong brace against the cleats G, to prevent any side motion or weakness in the crate, and this is a valuable point in the construction, as the crate is always made tight and firm by simply screwing the nuts down.

The upper ends of the screws upon the bolts are headed down sufficiently to prevent the nuts from being turned entirely off and lost.

These crates or boxes may be made of any desired size or form, and employed, as before stated, to convey any articles.

When used for certain purposes it may be found necessary or advisable to divide the box by partitions, and it will then only be necessary to introduce the partition or partitions at the proper points, forming them of bars, like the ends, and securing them by bolts, as shown at Fig. 3. These partitions will thus fold with the remainder of the box, lying between the side bars in the same manner as the ends do.

Having thus described my invention, what I claim as new, and desire to secure by Letters Patent, is—

The crate or box formed of the alternating bars A, united by the bolts B and nuts, as shown, and provided with the end bars, H, in combination with the top and bottom E F, with their transverse cleats G, whereby the top and bottom are held in place and the whole box is made rigid, substantially as herein described.

In witness whereof I have hereunto set my hand.

ROSWELL E. MOREY.

Witnesses:
S. H. NOURSE,
FRANK A. BROOKS.